(12) United States Patent
Drouillard et al.

(10) Patent No.: US 7,757,653 B2
(45) Date of Patent: Jul. 20, 2010

(54) INTEGRATED EXHAUST MANIFOLD AND CYLINDER HEAD GASKET

(75) Inventors: Darrell Drouillard, Tecumseh (CA); Steven Dropps, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 733 days.

(21) Appl. No.: 11/677,090

(22) Filed: Feb. 21, 2007

(65) Prior Publication Data

US 2008/0197577 A1    Aug. 21, 2008

(51) Int. Cl.
*F02F 11/00* (2006.01)
(52) U.S. Cl. .................... 123/193.5; 277/592
(58) Field of Classification Search ......... 277/591–601; 123/193.5
See application file for complete search history.

(56) References Cited

U.S. PATENT DOCUMENTS

| | | | |
|---|---|---|---|
| 5,393,076 A * | 2/1995 | Hagiwara et al. ........... 277/592 |
| 5,882,013 A | 3/1999 | Genter et al. |
| 5,895,056 A | 4/1999 | Habuta |
| 5,924,701 A | 7/1999 | Schweiger |
| 6,145,847 A * | 11/2000 | Maeda et al. ............... 277/593 |
| 6,206,381 B1 * | 3/2001 | Ii et al. ....................... 277/593 |
| 6,318,734 B1 * | 11/2001 | Boskamp ..................... 277/598 |
| 2001/0048201 A1 | 12/2001 | Hegmann |
| 2002/0153667 A1 * | 10/2002 | Battistoni et al. ........... 277/602 |
| 2005/0269789 A1 * | 12/2005 | Kameyama ................. 277/592 |
| 2006/0202431 A1 * | 9/2006 | Breen ......................... 277/592 |

FOREIGN PATENT DOCUMENTS

JP        09-264428 A        10/1997

* cited by examiner

*Primary Examiner*—M. McMahon

(57) ABSTRACT

A gasket assembly for an internal combustion engine having a cylinder head gasket and an exhaust manifold gasket. The cylinder head gasket and the exhaust manifold gasket have a common layer of gasket material. The gasket assembly is formed by stamping a cylinder head gasket portion for the engine in one region of a common layer of gasket material concurrently with stamping an exhaust gasket portion for the engine in an adjacent region of the common layer of material.

6 Claims, 3 Drawing Sheets

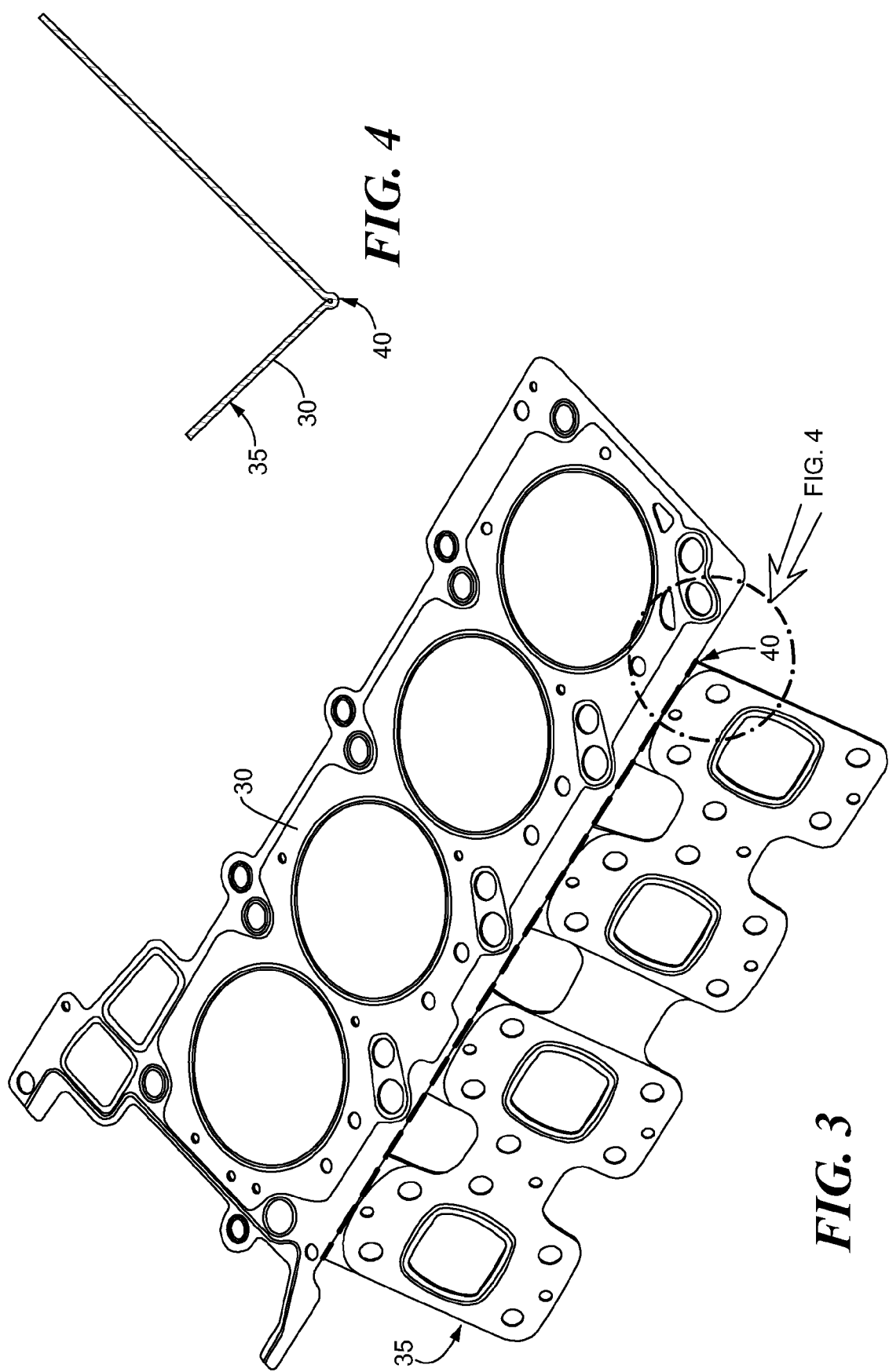

INTEGRATED EXHAUST MANIFOLD AND CYLINDER HEAD GASKET

TECHNICAL FIELD

This invention relates generally to internal combustion engine exhaust manifold and cylinder head gaskets.

BACKGROUND AND SUMMARY

As is known in the art, V-Engine, I4 and Diesel engines currently design unique gaskets for both the cylinder head and exhaust manifold. Both gaskets are separately manufactured, packaged, and shipped to engine assembly plants.

In accordance with the present invention, a gasket assembly for an internal combustion engine is provided having a combined cylinder head gasket and an exhaust gasket. The cylinder head gasket and the exhaust gasket have a common layer of gasket material. The gasket assembly is formed by stamping a cylinder head gasket portion for the engine in one region of a common layer of gasket material concurrently with stamping an exhaust gasket portion for the engine in an adjacent region of the common layer of material.

With such invention, an exhaust manifold gasket is formed as an integral appendage to a cylinder head gasket. The cylinder head gasket and the exhaust manifold gasket unit comprises a common layer of gasket base material, the cylinder head gasket having at least one additional layer of a different material bonded to the common gasket base material. The entire integrated gasket would be shipped as one piece to an engine plant and be installed prior to the cylinder head installation. At that point the exhaust manifold gasket would be a protruding appendage from the head deck joint. It could then: 1) be folded 90 degrees against the cylinder head exhaust face; or 2) be sheared from a perforation and installed against the cylinder head exhaust ports. Installation of the exhaust manifold would be conventional. The invention results in significant savings from supply base reduction, packaging, shipping, material handling.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a sketch of a common material used for both the cylinder head gasket and the exhaust manifold gasket of FIG. 1; and FIG. 4 is an enlarged view of a portion of FIG. 3, such portion being enclosed by the circle FIG. 3 in FIG. 3.

Like reference symbols in the various drawings indicate like elements.

DETAILED DESCRIPTION

Figure 1:
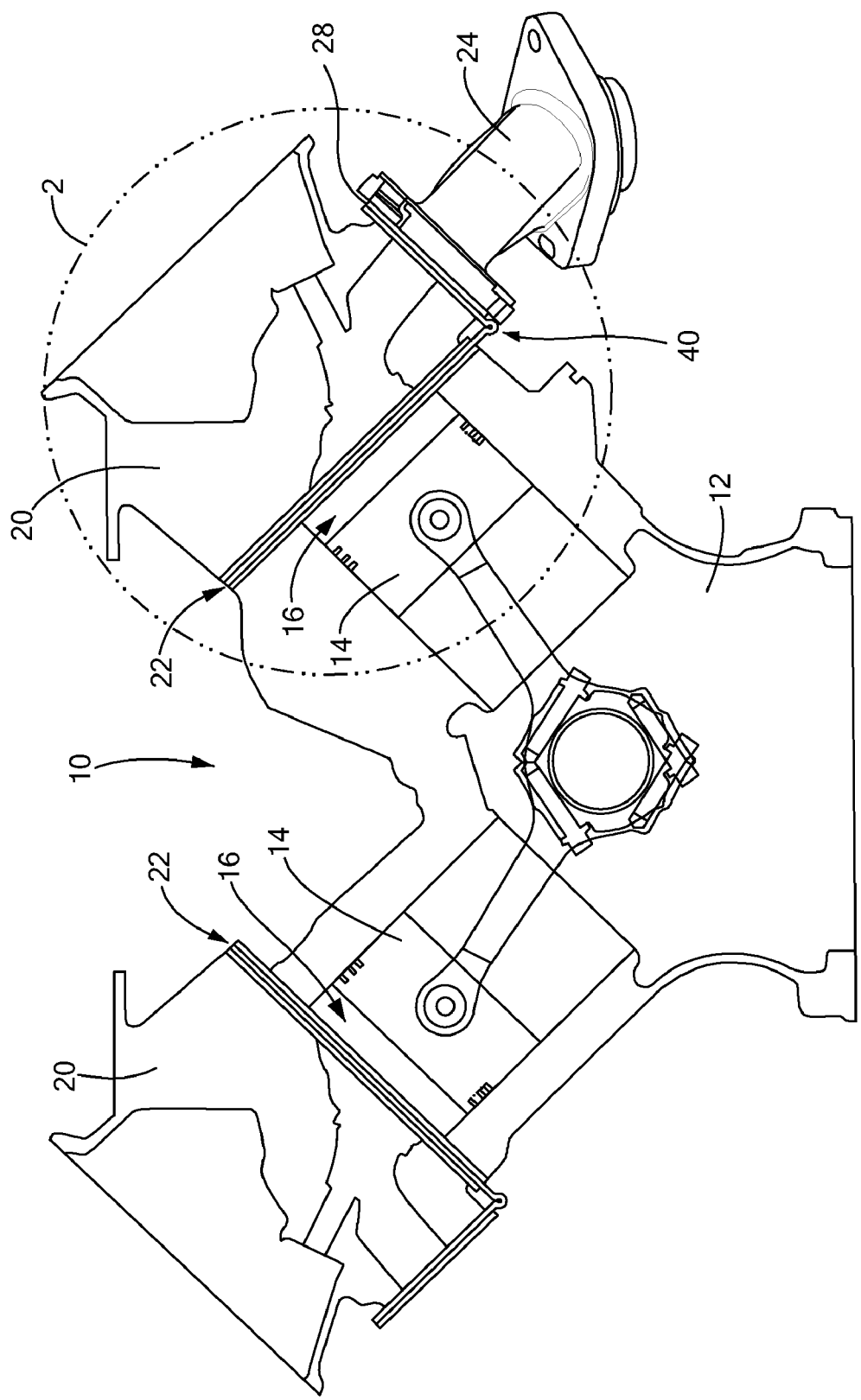
FIG. 1 is across section sketch of a portion of a V-6 or V-8 internal combustion engine having an integral cylinder head and exhaust manifold gasket according to the invention.
Figure 2:
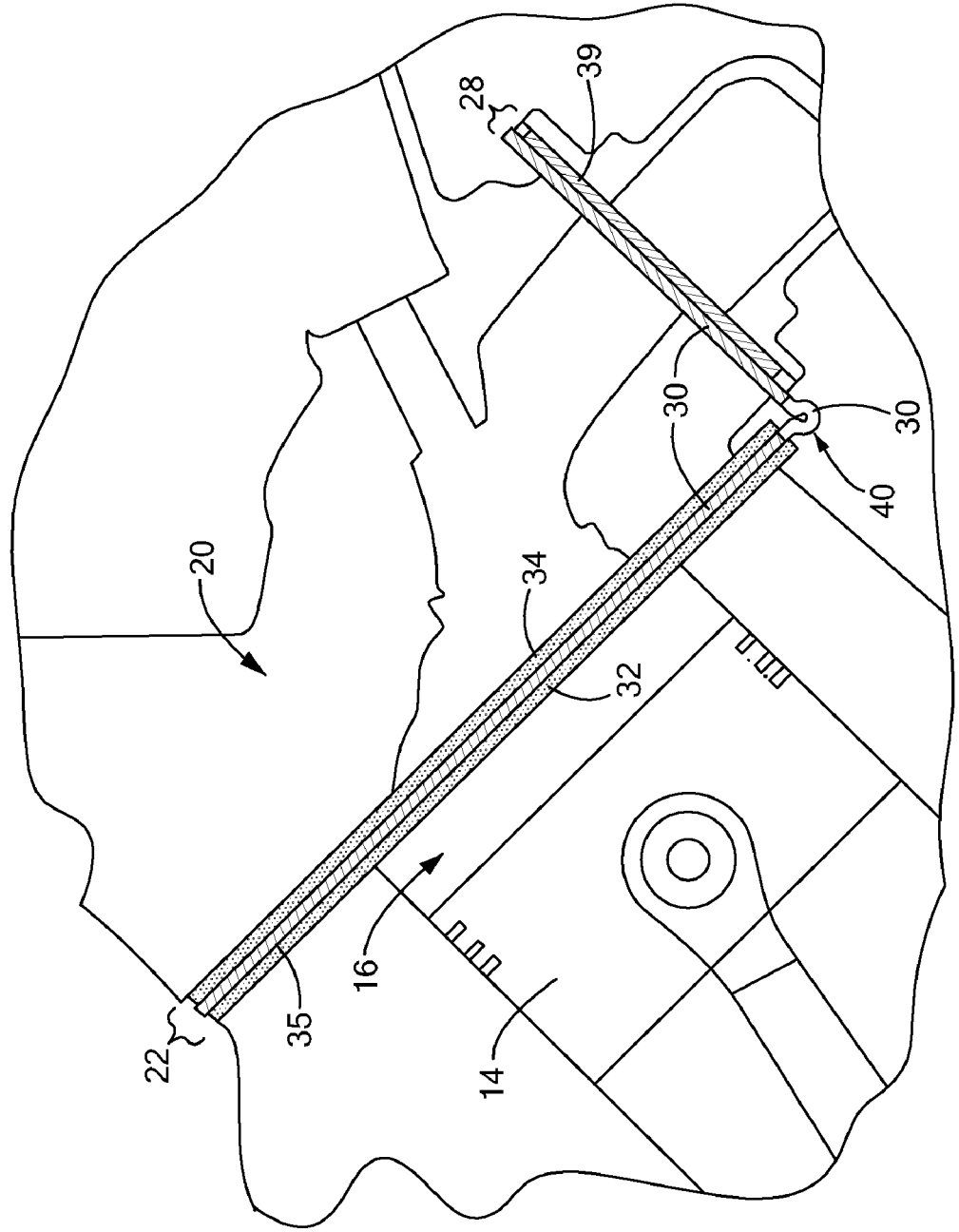
FIG. 2 is an enlarged portion of the engine of FIG. 1, such enlarged portion being encircled by the circle 2 in FIG. 2.

Referring now to FIGS. 1 and 2, a portion of an internal combustion engine 10 is shown. Here the engine 10 is either a V-8 or V-6 engine having within an engine block 12 thereof a pair of pistons 14 disposed within a pair of cylinders 16 formed within the engine block 12.

A pair of cylinder heads 20 is mounded to the cylinder block 12 over the cylinders 16. A head gasket 22, to be described in more detail below provides a seal between the cylinder block 12 and the cylinder head 20.

An exhaust manifold, 24 shown here for only one of the two cylinders 16, it being understood that both cylinders 16 would have such an exhaust manifold 24, is mounted to the cylinder head 20 with an exhaust gasket 28, to be described, being used to seal the exhaust manifold 24 and the cylinder head 20.

As shown more clearly in FIG. 2, the head gasket 22 and the exhaust manifold gasket 28 are formed as an integral unit 35. More particularly, a common gasket base material 30 (typically a 300 series hardened stainless steel) is used for both the cylinder head gasket 22 and the exhaust gasket 28. The cylinder head gasket 22 and the exhaust manifold gasket 28 thus have the common, single active base layer, gasket base material 30 with the cylinder head gasket 22 having at least one additional layer, here two layers 32, 34 of similar material (which can be mechanically staked, riveted, or spot welded to the base layer) from the common material layer 30, bonded to the common gasket base material 30. It is noted that the common material layer 30 is a common sheet with the cylinder head gasket portion of the material 30 and the exhaust gasket portion of the material 30 being hinged together at region 40.

Referring now also to FIG. 3, the common material 30 portion of the entire gasket unit 35 is formed in one stamping and then shipped as one piece to an engine plant for installation prior to cylinder head installation (assembly of the cylinder head to the engine block). At that point the exhaust manifold gasket is a protruding appendage from the head deck joint at region 40. The common material 30 could then: 1) be folded 90 degrees against the cylinder head exhaust face as shown in FIGS. 1-4, or 2) be sheared from a perforation along region 40 and installed against the cylinder head exhaust ports. The additional layers 32, 34 for the cylinder head gasket and the additional layer 36 (FIG. 2) are formed either as part of the base material forming operation or in separate dies (i.e., similar material, which can be mechanically staked, riveted, or spot-welded to the base layer in subsequent operations).

A number of embodiments of the invention have been described. Nevertheless, it will be understood that various modifications may be made without departing from the spirit and scope of the invention. Accordingly, other embodiments are within the scope of the following claims.

What is claimed is:

1. A gasket assembly for an internal combustion engine, comprising a cylinder head gasket; an exhaust gasket; wherein the cylinder head gasket and the exhaust gasket have a common layer of gasket material, a first portion of the common layer provides the cylinder head gasket and a second portion of the common layer provides the exhaust gasket, wherein the first and second portions are connected together through a folded region disposed between said first and second portions.

2. A gasket assembly for an internal combustion engine, comprising a cylinder head gasket; an exhaust gasket; wherein the cylinder head gasket and the exhaust gasket have a common layer of gasket material, a first portion of the common layer provides the cylinder head gasket and a second portion of the common layer provides the exhaust gasket, wherein the first and second portions are connected together through a perforated region disposed between said first and second portions.

3. The gasket assembly recited in claim 1 including at least one additional layer on the first portion of the common layer.

4. The gasket assembly recited in claim 2 including at least one additional layer on the first portion of the common layer.

5. An internal combustion engine, comprising: an engine block having a cylinder therein; a cylinder head; an exhaust manifold; a cylinder head gasket disposed between the cylinder head and the engine block; an exhaust gasket disposed between the cylinder head and the exhaust manifold; and wherein the cylinder head gasket and the exhaust gasket have a common layer of gasket material, wherein a first portion of the common layer provides the cylinder head gasket and a second portion of the common layer provides the exhaust gasket, wherein the first and second portions are connected together through a folded region disposed between said first and second portions.

6. The internal combustion engine recited in claim 5 including at least one additional layer on the first portion of the common layer.

* * * * *